United States Patent
Sabloniere

(10) Patent No.: US 10,657,475 B2
(45) Date of Patent: May 19, 2020

(54) COST EFFECTIVE DATA STORAGE

(71) Applicant: International Business Machines Corporation, Armonk, NY (US)

(72) Inventor: Pierre Sabloniere, Paris (FR)

(73) Assignee: International Business Machines Corporation, Armonk, NY (US)

( * ) Notice: Subject to any disclaimer, the term of this patent is extended or adjusted under 35 U.S.C. 154(b) by 1135 days.

(21) Appl. No.: 14/877,190

(22) Filed: Oct. 7, 2015

(65) Prior Publication Data

US 2017/0103356 A1   Apr. 13, 2017

(51) Int. Cl.
*G06Q 10/06* (2012.01)
*G06F 16/174* (2019.01)
*G06F 3/06* (2006.01)

(52) U.S. Cl.
CPC ..... *G06Q 10/06315* (2013.01); *G06F 3/0608* (2013.01); *G06F 3/0644* (2013.01); *G06F 3/0649* (2013.01); *G06F 3/0689* (2013.01); *G06F 16/1744* (2019.01)

(58) Field of Classification Search
CPC ............... G06Q 10/06315; G06F 3/06; G06F 17/30153; G06F 16/1744; G06F 3/0608; G06F 3/0644; G06F 3/0689; G06F 3/0649
See application file for complete search history.

(56) References Cited

U.S. PATENT DOCUMENTS

| | | | |
|---|---|---|---|
| 8,108,442 B2 | 1/2012 | Johnson et al. | |
| 8,428,986 B2 * | 4/2013 | Bisel | G06Q 10/06 705/7.11 |
| 8,447,948 B1 * | 5/2013 | Erdogan | G06F 12/0871 711/129 |
| 8,862,837 B1 | 10/2014 | Marshak et al. | |
| 9,983,795 B1 * | 5/2018 | Naamad | G06F 3/061 |
| 2011/0082842 A1 * | 4/2011 | Groseclose, Jr. | G06F 3/0608 707/693 |

OTHER PUBLICATIONS

Sabloniere, "Session: sSS2202: Spectrum Virtualize Infrastructures & Turbo Compression: technology, use cases, financial savings & Client studies," 2015 IBM Systems Technical University, Apr. 21-24, 2015, Prague, Czech Republic, 63 pages.

* cited by examiner

*Primary Examiner* — Mark D Featherstone
*Assistant Examiner* — Faezeh Forouharnejad
(74) *Attorney, Agent, or Firm* — Kristofer L. Haggerty

(57) ABSTRACT

Embodiments of the present invention disclose a method, system, and computer program product for cost effective data storage. A computer stores and arranges data in data storage resources in compressed or uncompressed arrangements. The computer determines what percentage of data is stored per tier for an uncompressed arrangement of data. The computer further determines both a compression factor as well as the percentage of data stored per tier for data stored in the compressed arrangement. The computer accesses data defining the cost per tier of both the compressed and uncompressed arrangement of data, then calculates the cost of both a compressed and uncompressed arrangement of the data. The computer then moves the data to the less expensive of the compressed or uncompressed arrangement of the data.

15 Claims, 8 Drawing Sheets

COST EFFECTIVE DATA STORAGE

TECHNICAL FIELD

The present invention relates generally to data storage, and more particularly to optimizing the cost of storing data.

BACKGROUND

Whether it be for storing information such as documents, photos, or videos, data storage has become an essential part of modern day technology. With the ever increasing amounts of data stored on a daily basis, data storage can become both resource and cost consuming for an entity in the business of storing data. In addition to the large amounts of data that need be stored, storing data is complicated by the variety of ways and purposes the data is used, prompting the decision of what kind of storage is necessary. For example, while flash memory is faster than a spinning hard disk, it is also more costly. Similarly, while compressed data requires less space, it generally takes longer to access. With the increase in data that need be stored and the many different manners of doing so, it becomes increasingly difficult to determine the most cost effective solution to storing data.

SUMMARY

Embodiments of the present invention disclose a method, system, and computer program product for cost effective data storage. A computer stores and arranges data in data storage resources in compressed or uncompressed arrangements. The computer determines what percentage of data is stored per tier for an uncompressed arrangement of data. The computer further determines both a compression factor as well as the percentage of data stored per tier for data stored in the compressed arrangement. The computer accesses data defining the cost per tier of both the compressed and uncompressed arrangement of data, then calculates the cost of both a compressed and uncompressed arrangement of the data. The computer then moves the data to the less expensive of the compressed or uncompressed arrangement of the data.

DETAILED DESCRIPTION

Figure 1:
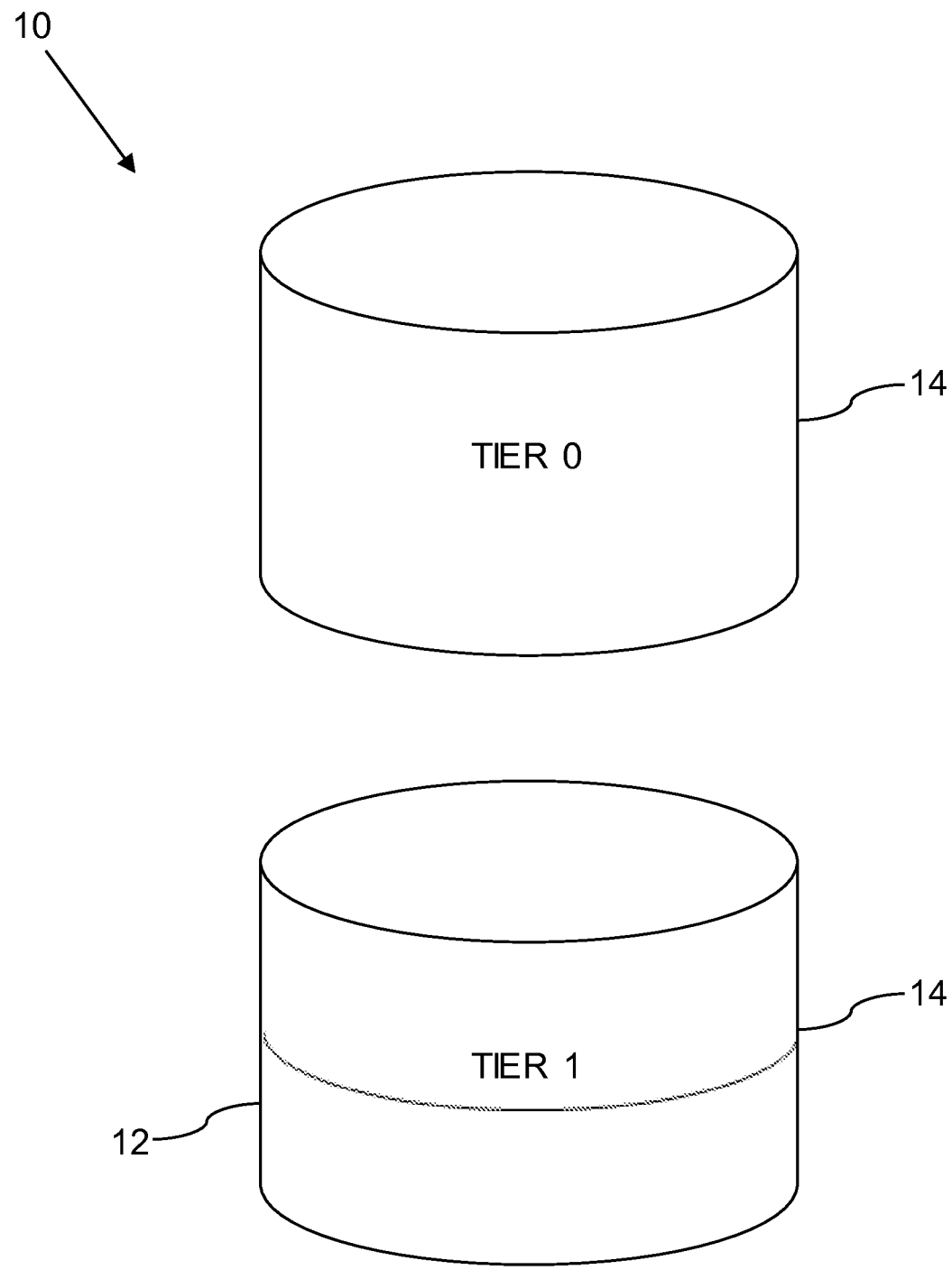
FIGS. 1 to 3 are schematic diagrams of data storage arrangements, in accordance with an embodiment of the invention.

FIG. 1 shows a data storage arrangement 10 which is used for storing data 12 in data storage resources 14 arranged in tiers. In this example, two resources 14 are arranged as tier 0 and tier 1 resources, with all of the data 12 currently being stored in the tier 1 storage device. FIG. 1 defines a very simple arrangement 10, however multiple additional tiers can be used and multiple different resources 14 can be located in the same tier. Data can be stored in any tier and moved from tier to tier at any time. One or more data controllers can be connected to the data storage arrangement to control the input and output (IO) of data to and from the resources 14. Auto-tiering can be used with such an arrangement of data stored in tiers, which process moves the data around the tiers to meet space, performance and cost requirements. Compression of data can also be used with auto-tiering in a process referred to as turbo compression.

In general, the performance of the tier 0 resource will be greater than the performance of the tier 1 resource, when measured in terms of speed and size of IO. The tier 0 resource may be a high specification flash drive, for example and the tier 1 resource may be a lower specification spinning disk hard drive, for example. Different technologies are used in different tiers to balance the key factors of price and performance. A tier 0 resource may be five or ten times as expensive as a tier 1 resource to purchase and will usually consume less power than a tier 1 resource. The cheaper tier 1 resource may have a larger data capacity.

The balance of the location of the data 12, in terms of where the data is stored, will depend upon the interrelation between a number of different factors, such as the amount of data being stored, the frequency of updates and access to the data, and the cost budget of the entity which is storing the data 12. This balance is particularly acute if the data storage is being provided to a third party as a service, since the costs of different tiers will be a real cost that is charged to an entity who is using the data storage arrangement 10. The choice of tiers used by the stored data 12 is a significant decision in relation to the trade-off between cost and performance.

Figure 2:
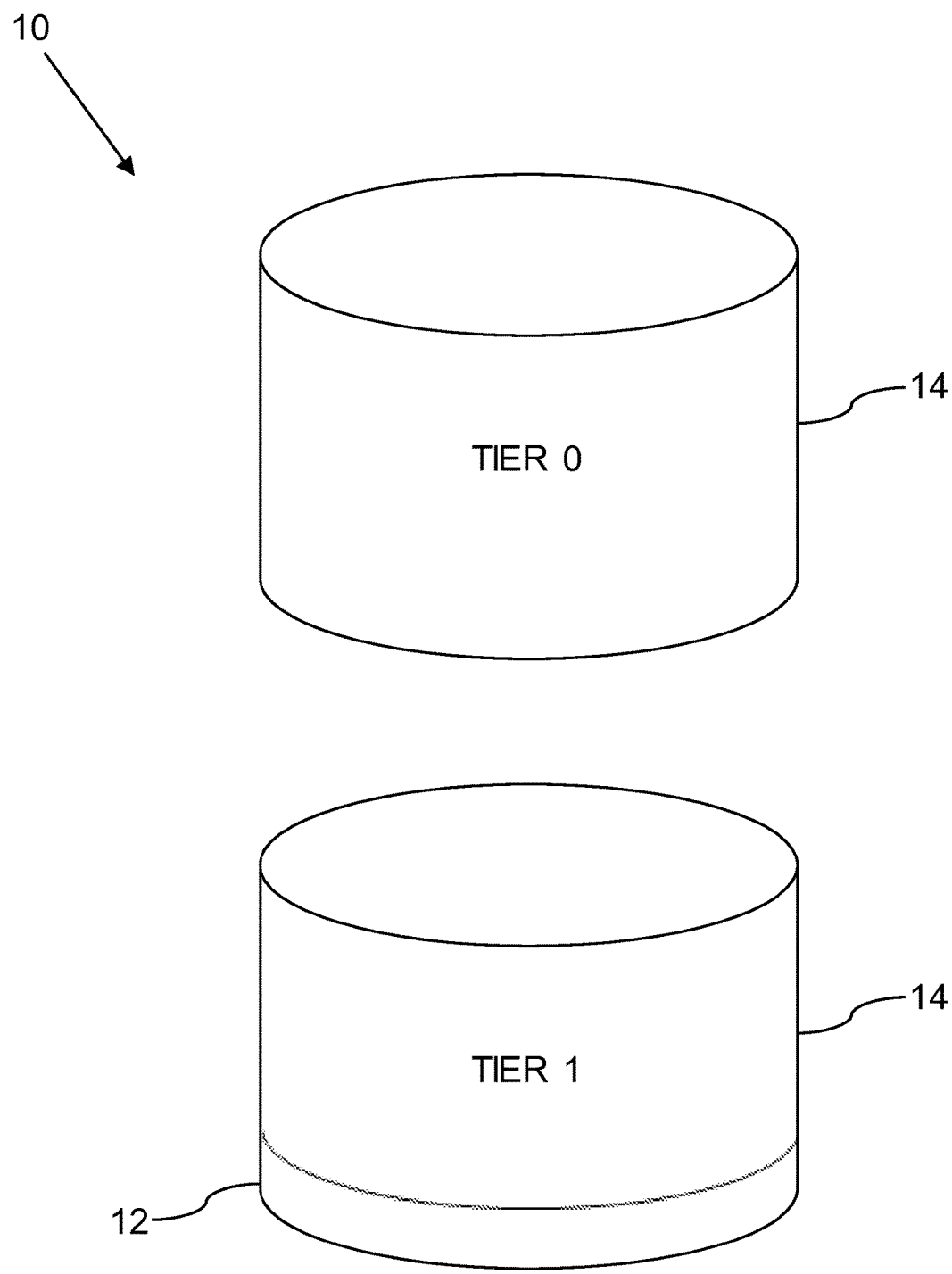
Figure 3:
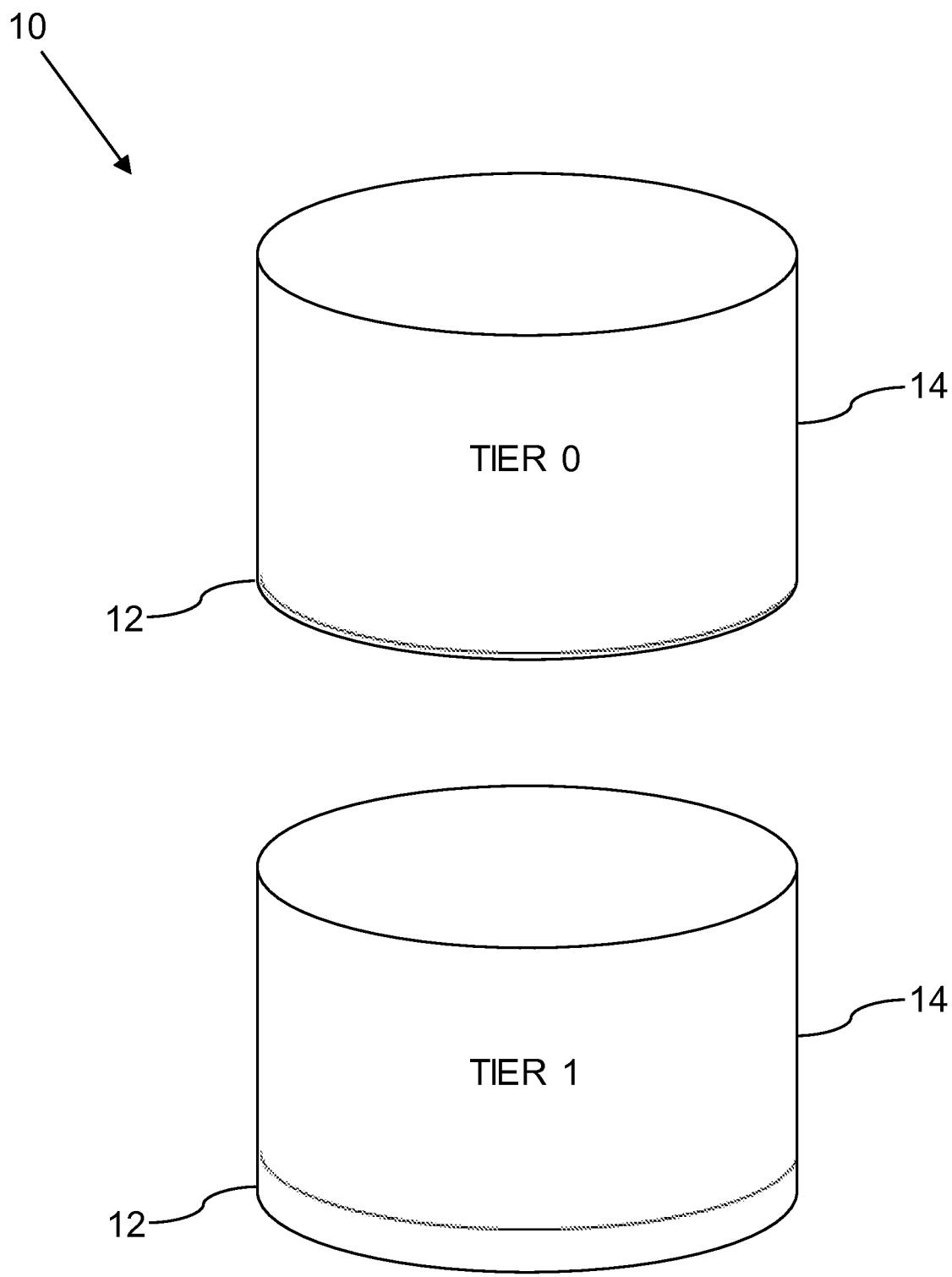

FIGS. 2 and 3 show two alternative arrangements of the data 12, when compared to the simple arrangement shown in FIG. 1. In FIG. 2, the same data 12 is still stored entirely in the tier 1 resource, but has now been compressed. A compression factor is difference in size between an uncompressed form and a compressed form. If the compressed form of data is 25% of the size of the uncompressed form of data, then the compression factor is 4 and the compression ratio is 25%. Compression factors of between 2 and 5 are common in such data compression operations. The amount of tier 1 storage that is needed as a result of the compression is reduced and this will save cost in relation to the use of resources.

However, the arrangement of FIG. 2 is not necessarily better than that shown in FIG. 1, since the act of data compression releases part of the tier 1 resource available for re-use. This will mean that additional new data will be stored on the tier 1 resource (since there is no point in compressing to release space if that space is not to be used) and this will increase the pressure on the IO performance of the tier 1 resource. The FIG. 2 arrangement will have a measurably worse IO performance when compared to the FIG. 1 arrangement in relation to the data 12, since the IO for the compressed data 12 will be increased by the IO for the newly freed part of the tier 1 resource.

This leads to the arrangement in FIG. 3, where the compressed data 12 is now split between tiers 0 and tiers 1. A small percentage of the data 12 is moved to the tier 0 resource. This percentage could be 5% of the data 12, for example, which could be a predetermined percentage or could be a calculated percentage based on a comparison of the actual performance of the data 12 under different IO conditions. Sufficient data is moved to the tier 0 resource such that the overall performance of the storage arrangement in FIG. 3 is the same as that shown in FIG. 1, but with a much smaller physical space capacity footprint, since the data is compressed.

Figure 4:
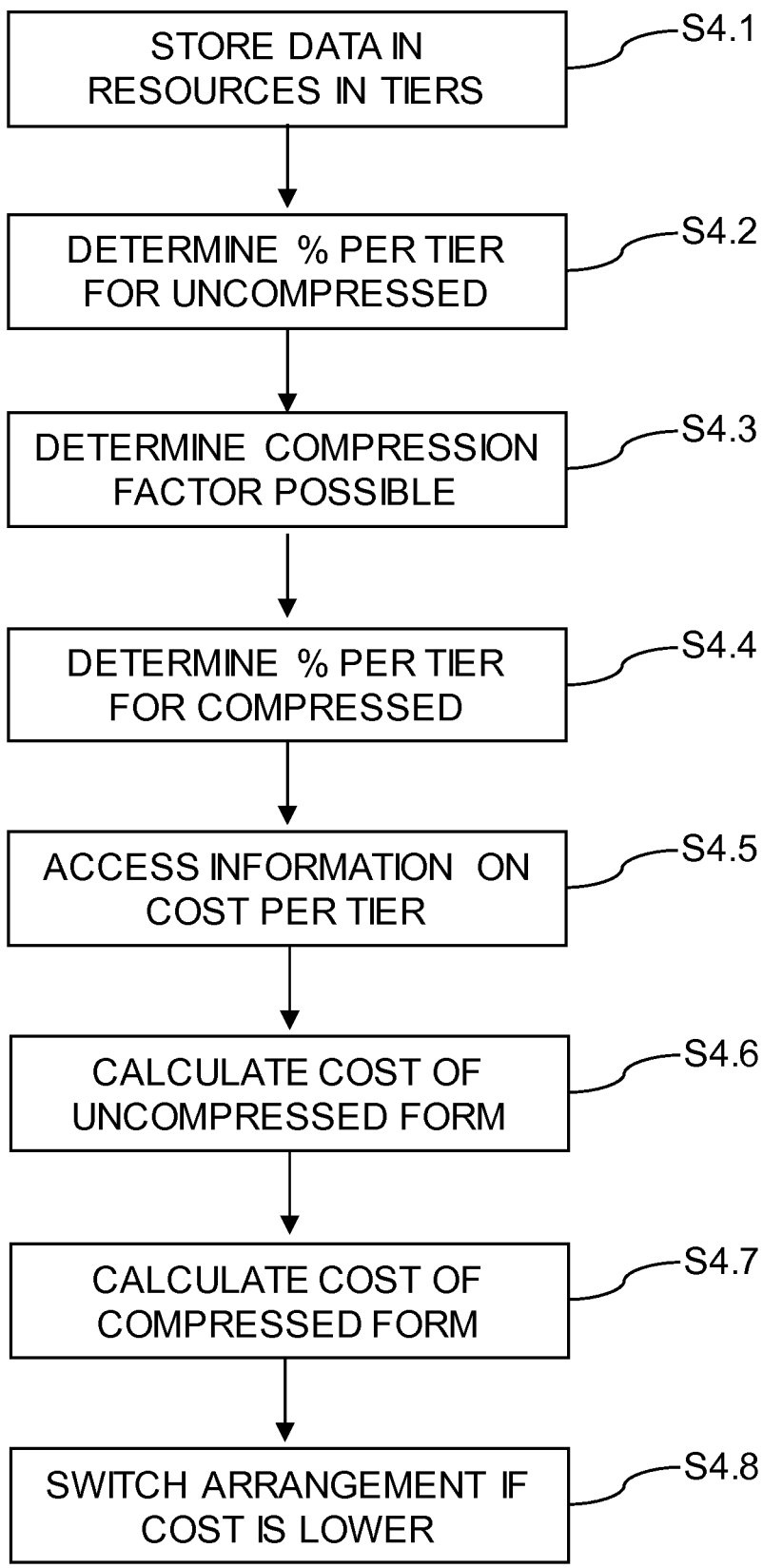
FIG. 4 is a flowchart illustrating the operations of cost-effective data storage.

Whether it is better to switch from the arrangement of FIG. 1 to the arrangement of FIG. 3 will depend upon the interrelationship of a number of different factors such as the amount of compression that can be achieved, the amount of data that has to be stored in the higher tier and the relative cost of different tiers (cost being a combination of an economic cost and/or a resource cost). If the data is currently in the format shown in FIG. 1, then switching to the arrangement shown in FIG. 3 is only viable if the cost is lower all other things being equal. FIG. 4 details a flowchart of a computer implemented method to determine whether to switch between arrangements.

In the flowchart illustrated by FIG. 4, step S4.1 comprises storing data in data storage resources arranged in tiers. Step S4.2 comprises determining a percentage of data stored per tier for an uncompressed arrangement of data in the data storage resources and step S4.3 comprises determining a compression factor for data stored in the data storage resources. This compression factor can be calculated by sampling the data that is stored and seeing what level of compression can be achieved or a standard compression factor can be used.

Step S4.4 comprises determining a percentage of data stored per tier for a compressed arrangement of data in the data storage resources. These different arrangements can be defined against preferred models or can be based on actual performance measurements. In the uncompressed state, the preferred arrangement may be all data on tier 1, for example, and in the compressed state, the preferred arrangement may be as little data as possible on tier 0 (which will therefore need to be calculated).

Step S4.5 comprises accessing information defining cost per tier of the data storage arrangement. The cost could be a ratio between tiers, with the lowest tier set at a cost of 1. The cost does not need to be an exact economic measurement, the cost can encompass technical factors such as power consumption and so on. The defined cost can reflect the desirability of the different tiers.

Step S4.6 comprises calculating a cost for the uncompressed arrangement of data from the determined percentage of data stored per tier for an uncompressed arrangement of data in the data storage resources and the accessed information defining cost per tier of the data storage arrangement. Step S4.7 comprises calculating a cost for the compressed arrangement of data from the determined percentage of data stored per tier for a compressed arrangement of data in the data storage resources, the determined compression factor and the accessed information defining cost per tier of the data storage arrangement. The relative costs between the two arrangements can therefore be calculated from the information gathered in the previous steps. Again, cost is not necessarily a pure economic measure, the output will be a relative desirability of the two arrangement in relation to the amount of compression possible and the movement of data between tiers.

At step S4.8, if the calculated cost of the compressed arrangement of data is lower than the calculated cost of the uncompressed arrangement of data and the data is currently stored in an uncompressed arrangement, the stored data is switched to a compressed arrangement of data or, if the calculated cost of the compressed arrangement of data is greater than the calculated cost of the uncompressed arrangement of data and the data is currently stored in a compressed arrangement, the stored data is switched to an uncompressed arrangement of data. The output of the calculation determines whether the operation of the storage arrangement is best served by using the compressed arrangement of FIG. 3, rather than the uncompressed arrangement of FIG. 1. If the preferred storage arrangement is not the current storage arrangement, then a switch takes places, switching from uncompressed to compressed or vice versa.

If more than two tiers are used in the storage arrangement, the same analysis applies, as long as the percentage of usage of each tier in the two different arrangements is known. The method of FIG. 4 is able to compare the arrangements of multiple tiers when there are three or more tiers.

Figure 5:
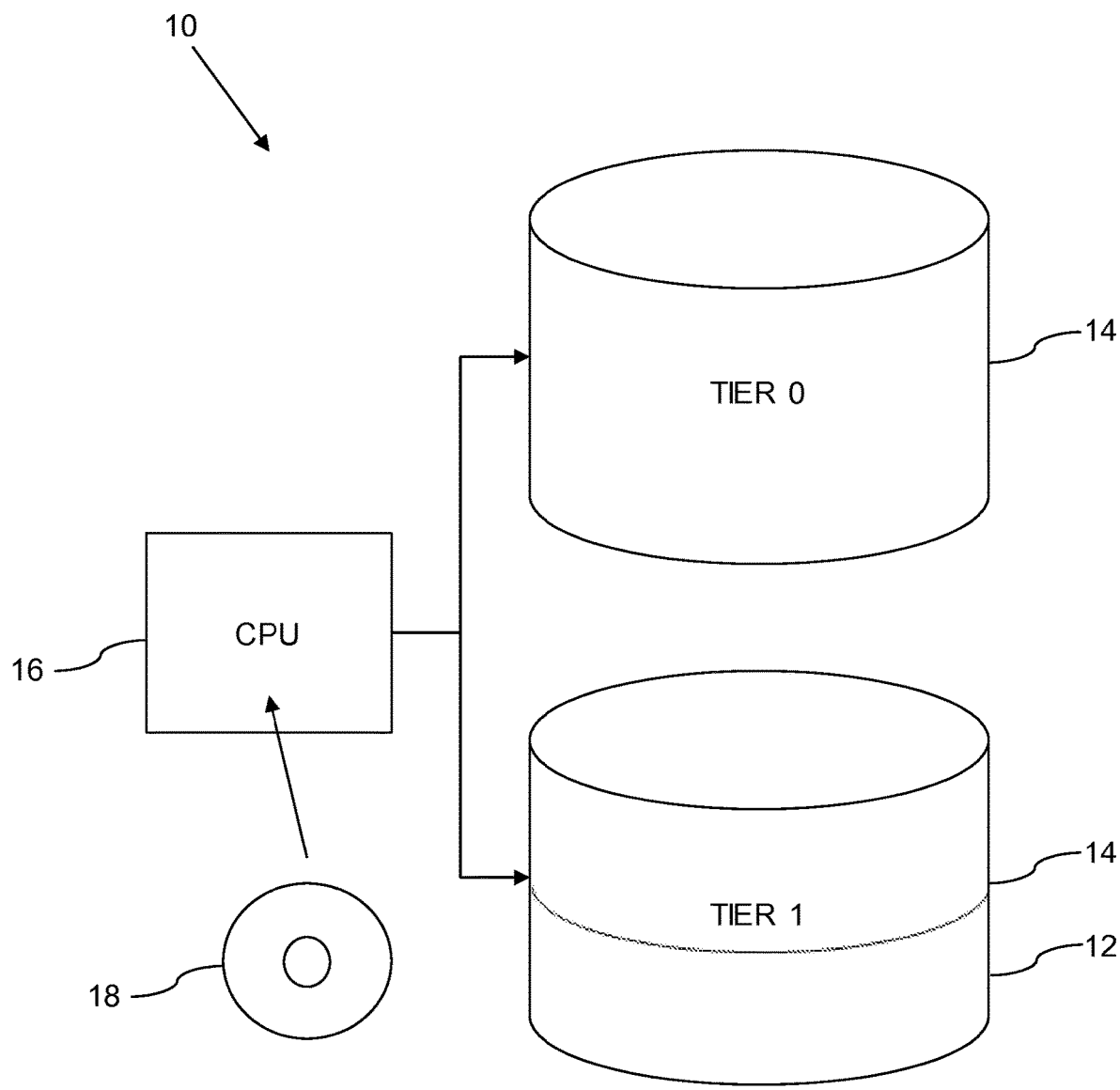
FIG. 5 is a schematic diagram of server connected to a data storage arrangement, in accordance with an embodiment of the invention.

FIG. 5 shows a system comprising a data storage arrangement 10 which is arranged to store data 12 in data storage resources 14 arranged in tiers and a processor (CPU) 16 which is connected to the data storage arrangement 12 and is arranged to control the location of the data 12, according to the flowchart of FIG. 4. The processor 16 can be located in a separate server that is connected to the resources 14, or could form part of the data management hardware that connects the resources 14 to an external network in order that external clients and servers can access the data storage arrangement 10. The function of the processor 16 can be distributed across several different hardware devices.

In a preferred embodiment, the processor 16 is operated according to a computer program product on a computer readable medium 18, which here is a CD-ROM 18. The computer program product comprises a series of instructions that are used to control the operation of the processor 18. The processor 16 will periodically examine the configuration of the data that is being stored by the storage arrangement 10 in order to determine whether the data should be stored in a compressed or in an uncompressed form. The processor 16 can gather performance data at all times, relating to such metrics as IO performance and the compression factor achievable, in order to perform a periodic optimisation cycle.

The processor 16 will convert the data from the uncompressed form of FIG. 1 to the compressed form of FIG. 3, if and only if there are cost savings to be achieved by such a switch. The cost can be calculated according to the flowchart of FIG. 4, with the resulting decision whether to make a switch being taken and implemented by the processor 16. Since there are processing and time implications in making a switch between configurations, the processor 16 is only scheduled to perform the analysis periodically and can use a threshold to determine whether sufficient savings exist to justify the switch from one configuration to the other configuration.

Figure 6:
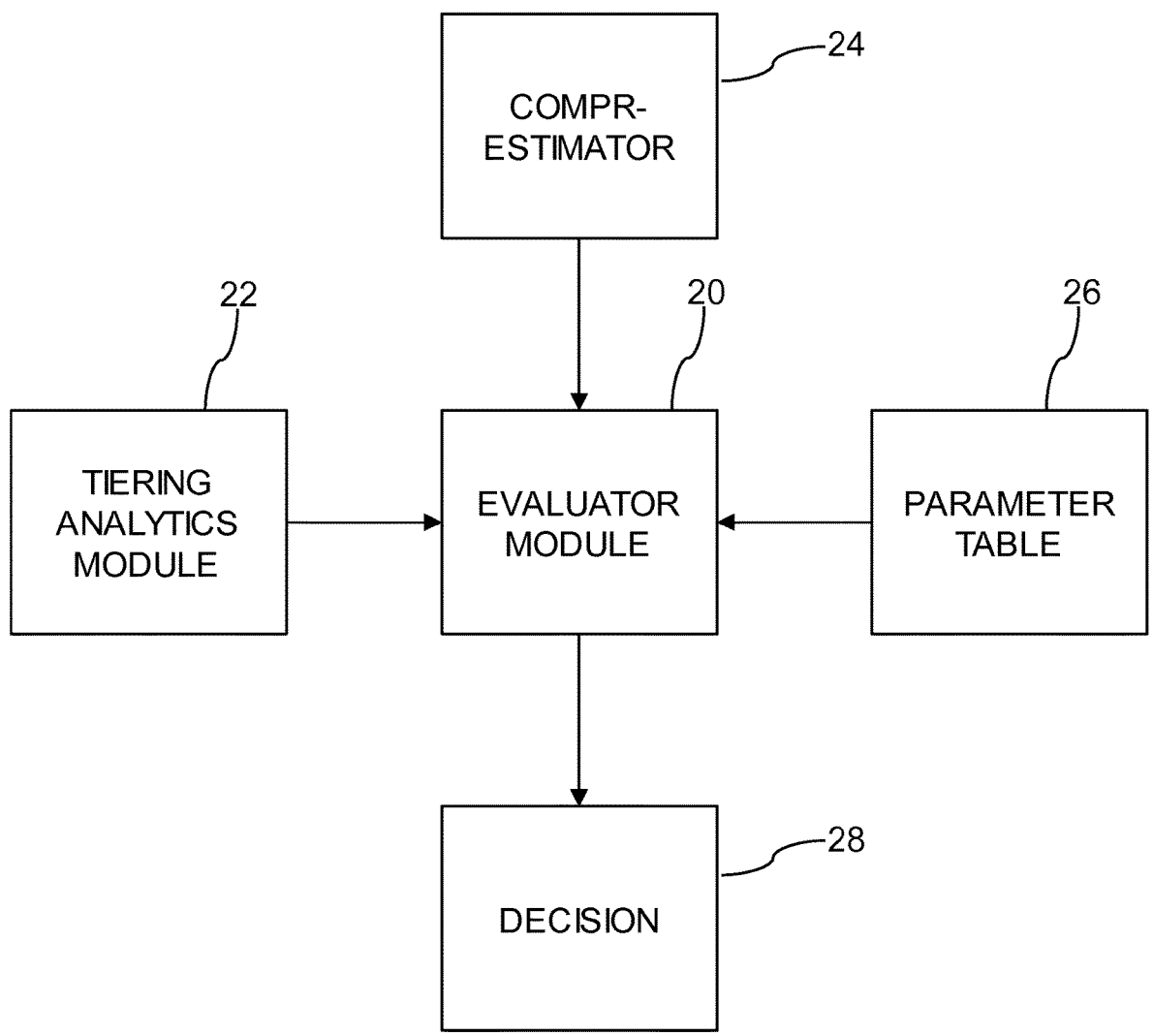
FIG. 6 is a schematic diagram of an optimisation process, in accordance with an embodiment of the invention.

FIG. 6 shows a second embodiment of the optimisation process, which has an evaluator model 20 that receives inputs from a tiering analytics module 22, a comprestimator 24 and a parameter table 26. The evaluator module 20 outputs a decision 28. The comprestimator 24 analyses by sampling the level of compressibility of a volume and is able to represent this as a compression factor (CF). The comprestimator 24 can operate by accessing volumes using SCSI commands on board a server using the volume. In the preferred embodiment, the same mechanism is implemented on board a virtualization engine to produce CF values for each extent of a volume and then aggregate all CF values to produce the same consolidated view at volume level. In general, the level of compressibility of a volume does not vary much over time and therefore the processor 18 would be able to perform the comprestimator function only for newly created volumes until the volumes stabilise or reuse existing compression factors for multiple iteration cycles.

The storage tiering analytics module 22 analyses volume behaviour using sub-volume granularity (at an extent level) and optimises extent placement across various storage tiers and reports for each extent the IO per second activity and tier placement sorted by IO/s in decreasing sequence. The module 22 also reports the relative cumulated amount of extents generating 100% minus CF of the total IO/s of the volume, which is represented as volume skew[CF].

Figure 7:
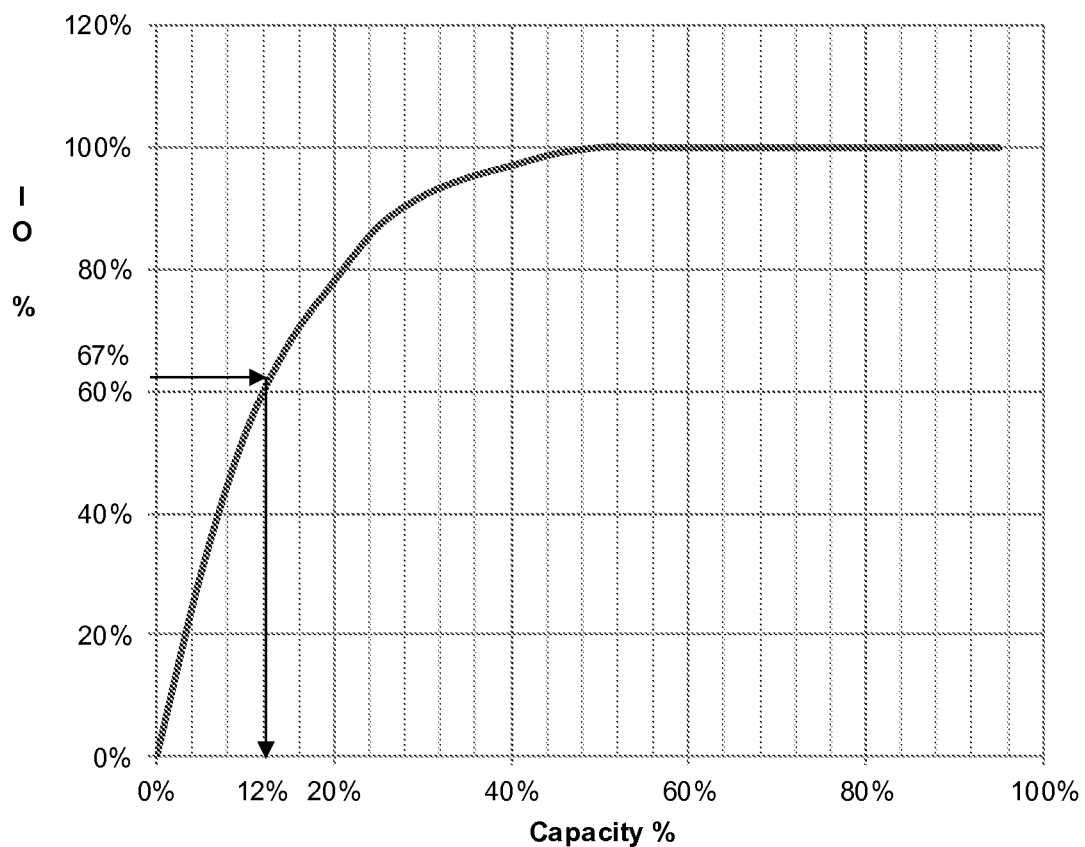
FIG. 7 is a graph of cumulative I/O activity versus capacity, in accordance with an embodiment of the invention.

The definition of the volume skew is the relative cumulated amount of extents generating 100% minus 1 divided by CF. The value of the volume skew differs depending on the characteristics of the data being stored in relation to the I/O and the value of the compression factor that is achievable. FIG. 7 illustrates a chart showing cumulative I/O per second against capacity for a specific storage volume. The chart shows that approximately 50% of the storage capacity is generating all of the I/O activity. In this example, the compression factor is 3 for the storage volume, as determined by the comprestimator 24. The volume skew is therefore 12% since two thirds of the total I/O is produced by 12% of the data.

The parameter table 26 contains economical values of key parameters of the model such as the cost per capacity for each of the tiers and the cost per capacity of a compression license (CLC). The cost of the compression can be a factor in the comparison between configurations if a license fee has to be paid. A more sophisticated implementation can manage additional cost contributors over and above the tier costs and license cost, for example power and cooling expenses can represent a non-negligible percentage of storage costs. Similarly the actual components that perform the compression and decompression work and the related network connectivity costs can also be non-trivial elements within the cost calculation and can be included in the cost comparison. A cost for switching can be used and the switch will only be made if the gain from switching exceeds the cost of switching. The evaluator module 20 compares the cost of uncompressed form with the compressed form, in order to reach the final decision that is produced as the decision 28.

In a simplified case that compares an uncompressed arrangement on Tier 1 to a compressed form on Tier 0 and Tier 1 using a compression factor (CF), a compression license cost (CLC) and a volume_skew[CF], the following formulas can be arrived at:

Uncompressed=Volume_capacity×Tier 1_cost (1)

Compressed=Volume_capacity {CLC+Volume_skew [CF]×Tier0_cost/CF+(100%-Volume_skew [CF])×Tier1_cost/CF} (2)

The formula for the uncompressed arrangement is clearly straightforward, being the volume capacity consumed multiplied by the tier 1 cost. For the compressed arrangement, there are three separate components to the cost that are added together and then multiplied by the volume capacity consumed. These three components are the compression license cost (CLC) plus the cost of the amount on the data on the tier 0 plus the cost of the data on the tier 1.

These two formulas can be illustrated for a volume where the Volume_capacity=1, the Tier1_cost=1, the Tier0_cost=5×Tier1_cost, the CF=3, the Volume_skew[3] =12% and the CLC=Tier1_cost×1/10. From the above formulas the cost of the uncompressed arrangement is 1. The cost of the compressed arrangement has three components as discussed above. The CLC component=0.10, the Tier 0 cost is 12%×5/3 (4% being the amount of data on tier 0, 9 being the cost multiple for Tier 0 and 3 being the compression factor)=0.20, and the Tier 1 cost is 88%/3 (96% being the amount on tier 1 and 3 being the compression factor=0.29. These components being totalled together 0.10+0.20+ 0.29=0.59 showing that the compressed arrangement has a 41% cost advantage against the uncompressed arrangement of data.

If there are more than two different tiers in use in the data storage arrangement, then one or both of the formulas will need to be amended, depending upon the difference between the preferred arrangements used. For example, if three tiers are used, the uncompressed arrangement may have data stored on all three tiers in order to save on storage costs but also provide the necessary IO performance. In this case the formula for the uncompressed case will have multiple components reflecting the percentages and costs for each tier. The compressed formula may be the same though, with the perceived preferred arrangement being only tier 0 and tier 1 being used.

The method can also be used for existing systems where at a point in time resources are finite. This would be the case for instance in a situation where relatively expensive tier 0 resources would be in limited quantity and where the turbo compression analysis method would qualify a subset of volumes for compression for which the sum of tier 0 demand in compressed form would exceed the physical tier 0 capacity for this storage system. For this case, a cost based benefit metric would be used to determine which volumes would best utilize the tier 0 resources and which volumes from the subset would not be passed to tier 0 and should remain in un-compressed forms.

Another case to consider would be the situation where physical tier 0 resources would be in excess. In this situation, as some physical tier 0 resources would be available and already being paid for and leaving relatively expensive tier 0 capacity idle is not desirable, the optimization method would re-evaluate the benefits of uncompressed volumes with a formula where tier cost would be nil. This re-evaluation would generate an additional set of values allowing the selection of which volumes would best optimize the storage system behaviour.

Furthermore, as storage systems evolve over time, where volumes are added or removed and capacity is changed in the various tiers of the storage system, the cost based evaluation method would allow optimizing storage system benefits for the enterprise by selecting at each point in time which volumes should be in compressed form and which ones should be left in uncompressed form. The method could also be used for capacity planning purpose by producing a gap analysis report comparing existing physical tier resources and desired capacity values evaluated by a turbo compression benefit analysis module.

The present invention may be a system, a method, and/or a computer program product. The computer program product may include a computer readable storage medium (or media) having computer readable program instructions thereon for causing a processor to carry out aspects of the present invention.

Figure 8:
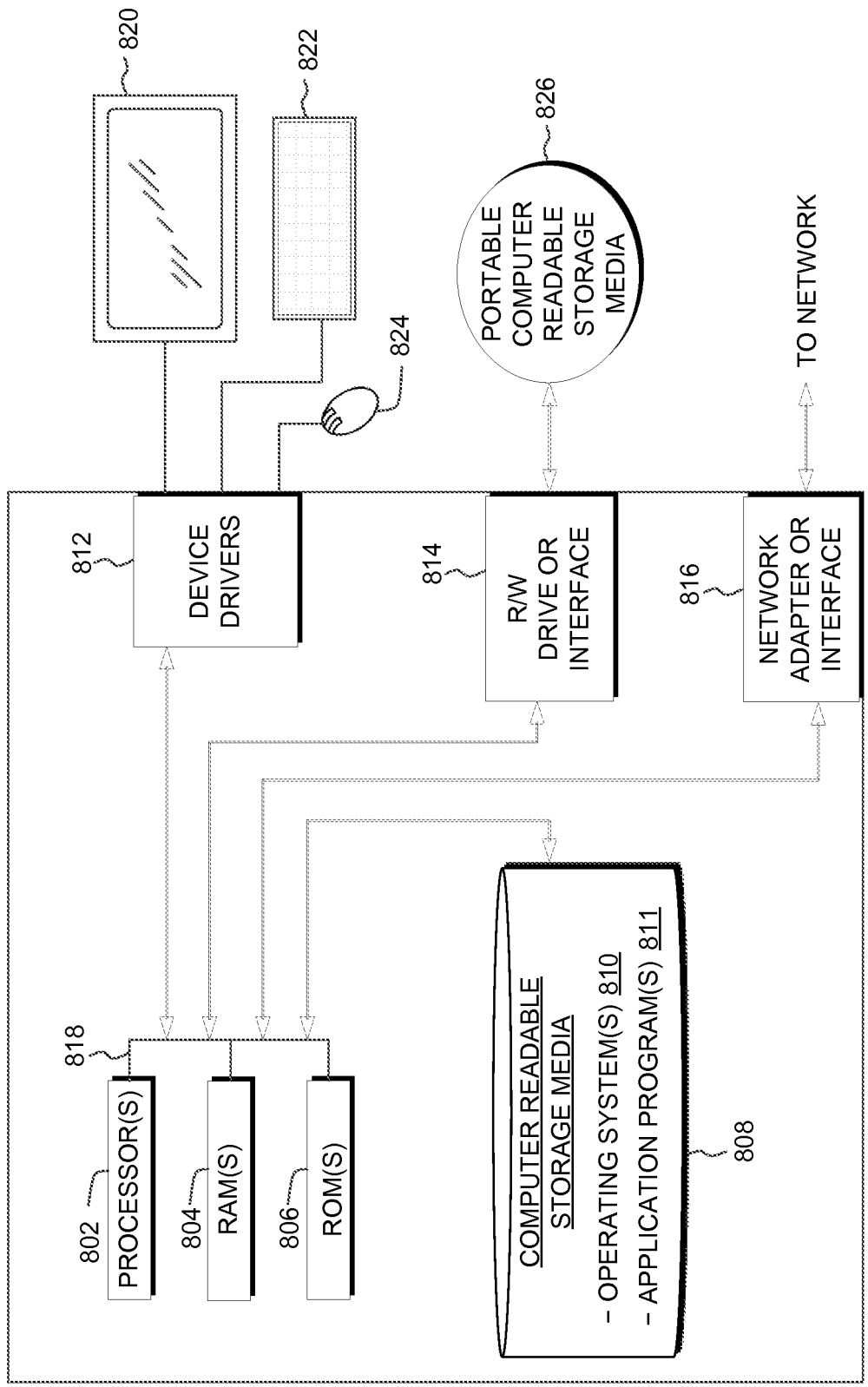
FIG. 8 is a block diagram depicting the hardware components of a cost effective data storage system 10 of FIG. 1, in accordance with an embodiment of the invention.

FIG. 8 depicts a block diagram of components of a computing device of a data storage arrangement system 10 in FIGS. 1, 2, 3 and the server described in FIG. 5, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

Computing device may include one or more processors 802, one or more computer-readable RAMs 804, one or more computer-readable ROMs 806, one or more computer readable storage media 808, device drivers 812, read/write drive or interface 814, network adapter or interface 816, all interconnected over a communications fabric 818. Communications fabric 818 may be implemented with any architecture designed for passing data and/or control information between processors (such as microprocessors, communications and network processors, etc.), system memory, peripheral devices, and any other hardware components within a system.

One or more operating systems 810, and one or more application programs 811 are stored on one or more of the computer readable storage media 808 for execution by one or more of the processors 802 via one or more of the respective RAMs 804 (which typically include cache memory). In the illustrated embodiment, each of the computer readable storage media 808 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device may also include a R/W drive or interface 814 to read from and write to one or more portable computer readable storage media 826. Application programs 811 on computing device may be stored on one or more of the portable computer readable storage media 826, read via the respective R/W drive or interface 814 and loaded into the respective computer readable storage media 808.

Computing device may also include a network adapter or interface 816, such as a TCP/IP adapter card or wireless communication adapter (such as a 4G wireless communication adapter using OFDMA technology). Application programs 811 on computing device may be downloaded to the computing device from an external computer or external storage device via a network (for example, the Internet, a local area network or other wide area network or wireless network) and network adapter or interface 816. From the network adapter or interface 816, the programs may be loaded onto computer readable storage media 808. The network may comprise copper wires, optical fibers, wireless transmission, routers, firewalls, switches, gateway computers and/or edge servers.

Computing device may also include a display screen 820, a keyboard or keypad 822, and a computer mouse or touchpad 824. Device drivers 812 interface to display screen 820 for imaging, to keyboard or keypad 822, to computer mouse or touchpad 824, and/or to display screen 820 for pressure sensing of alphanumeric character entry and user selections. The device drivers 812, R/W drive or interface 814 and network adapter or interface 816 may comprise hardware and software (stored on computer readable storage media 808 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for cost effective data management, the method comprising:
storing data in data storage resources arranged in tiers;
determining a percentage of data stored per tier for an uncompressed arrangement of data in the data storage resources;
determining a compression factor for data stored in the data storage resources based on compressing a sample subset of data stored in the data storage resources;
determining a percentage of data stored per tier for a compressed arrangement of data in the data storage resources;
accessing information defining a cost per tier of the compressed arrangement of data and a cost per tier of the uncompressed arrangement of data;
determining a volume skew of the stored data, wherein the volume skew is a relative cumulative amount of extents generating all of the inputs and outputs minus one divided by the compression factor;
calculating a cost for the uncompressed arrangement of data based on the determined percentage of data stored per tier for an uncompressed arrangement of data in the data storage resources and the accessed information defining cost per tier of the uncompressed arrangement of data;
calculating a cost for the compressed arrangement of data based on the determined percentage of data stored per tier for a compressed arrangement of data in the data storage resources, the determined compression factor, the determine volume skew, and the accessed information defining cost per tier of the compressed arrangement of data; and
based on the calculated cost of the compressed arrangement of data being less than the calculated cost of the uncompressed arrangement of data and the data being stored in an uncompressed arrangement, switching the stored data to a compressed arrangement of data,
wherein one or more steps of the above method are performed using one or more computers.

2. A method according to claim 1, wherein calculating a cost for the compressed arrangement of data is further based on a compression license cost.

3. A method according to claim 1, wherein the step of calculating the cost for the compressed arrangement of data further comprises program instructions to access information defining a cost per capacity for a compression operation, and wherein calculating the cost for the compressed arrangement of data is further based on the accessed information defining cost per capacity for a compression operation.

4. A method according to claim 1, further comprising:
based on the calculated cost of the compressed arrangement of data being greater than the calculated cost of the uncompressed arrangement of data and the data being stored in a compressed arrangement, switching the stored data to an uncompressed arrangement of data.

5. A method according to claim 1, wherein the step of determining a percentage of data stored per tier for a compressed arrangement of data in the data storage resources further comprises:
accessing performance information from the data storage resources arranged in tiers; and
calculated a percentage of data that must be stored in a higher tier based on the accessed performance information.

6. A computer program product for cost effective data management, the computer program product comprising:

one or more computer-readable storage media and program instructions stored on the one or more computer-readable storage media, the program instructions comprising:
  program instructions to store data in data storage resources arranged in tiers;
  program instructions to determine a percentage of data stored per tier for an uncompressed arrangement of data in the data storage resources;
  program instructions to determine a compression factor for data stored in the data storage resources based on compressing a sample subset of data stored in the data storage resources;
  program instructions to determine a percentage of data stored per tier for a compressed arrangement of data in the data storage resources;
  program instructions to access information defining a cost per tier of the compressed arrangement of data and a cost per tier of the uncompressed arrangement of data;
  program instructions to determine a volume skew of the stored data, wherein the volume skew is a relative cumulative amount of extents generating all of the inputs and outputs minus one divided by the compression factor;
  program instructions to calculate a cost for the uncompressed arrangement of data based on the determined percentage of data stored per tier for an uncompressed arrangement of data in the data storage resources and the accessed information defining cost per tier of the uncompressed arrangement of data;
  program instructions to calculate a cost for the compressed arrangement of data based on the determined percentage of data stored per tier for a compressed arrangement of data in the data storage resources, the determined compression factor, the volume skew, and the accessed information defining cost per tier of the compressed arrangement of data; and
  based on the calculated cost of the compressed arrangement of data being less than the calculated cost of the uncompressed arrangement of data and the data being stored in an uncompressed arrangement, program instructions to switch the stored data to a compressed arrangement of data.

7. The computer program product of claim 6, wherein calculating a cost for the compressed arrangement of data is further based on a compression license cost.

8. The computer program product of claim 6, wherein the step of calculating the cost for the compressed arrangement of data further comprises program instructions to access information defining a cost per capacity for a compression operation, and wherein calculating the cost for the compressed arrangement of data is further based on the accessed information defining cost per capacity for a compression operation.

9. The computer program product of claim 6, further comprising:
  based on the calculated cost of the compressed arrangement of data being greater than the calculated cost of the uncompressed arrangement of data and the data being stored in a compressed arrangement, program instructions to switch the stored data to an uncompressed arrangement of data.

10. The computer program product of claim 6, wherein the step of determining a percentage of data stored per tier for a compressed arrangement of data in the data storage resources further comprises:
  program instructions to access performance information from the data storage resources arranged in tiers; and
  program instructions to calculate a percentage of data that must be stored in a higher tier based on the accessed performance information.

11. A computer system for cost effective data management, the computer system comprising:
  one or more computer processors, one or more computer-readable storage media, and program instructions stored on one or more of the computer-readable storage media for execution by at least one of the one or more processors, the program instructions comprising:
  program instructions to store data in data storage resources arranged in tiers;
  program instructions to determine a percentage of data stored per tier for an uncompressed arrangement of data in the data storage resources;
  program instructions to determine a compression factor for data stored in the data storage resources based on compressing a sample subset of data stored in the data storage resources;
  program instructions to determine a percentage of data stored per tier for a compressed arrangement of data in the data storage resources;
  program instructions to access information defining a cost per tier of the compressed arrangement of data and a cost per tier of the uncompressed arrangement of data;
  program instructions to determine a volume skew of the stored data, wherein the volume skew is a relative cumulative amount of extents generating all of the inputs and outputs minus one divided by the compression factor;
  program instructions to calculate a cost for the uncompressed arrangement of data based on the determined percentage of data stored per tier for an uncompressed arrangement of data in the data storage resources and the accessed information defining cost per tier of the uncompressed arrangement of data;
  program instructions to calculate a cost for the compressed arrangement of data based on the determined percentage of data stored per tier for a compressed arrangement of data in the data storage resources, the determined compression factor, the volume skew, and the accessed information defining cost per tier of the compressed arrangement of data; and
  based on the calculated cost of the compressed arrangement of data being less than the calculated cost of the uncompressed arrangement of data and the data being stored in an uncompressed arrangement, program instructions to switch the stored data to a compressed arrangement of data.

12. The computer system of claim 11, wherein calculating a cost for the compressed arrangement of data is further based on a compression license cost.

13. The computer system of claim 11, wherein the step of calculating the cost for the compressed arrangement of data further comprises program instructions to access information defining a cost per capacity for a compression operation, and wherein calculating the cost for the compressed arrangement of data is further based on the accessed information defining cost per capacity for a compression operation.

14. The computer system of claim 11, further comprising:
  based on the calculated cost of the compressed arrangement of data being greater than the calculated cost of the uncompressed arrangement of data and the data being stored in a compressed arrangement, program instructions to switch the stored data to an uncompressed arrangement of data.

15. The computer system of claim 11, wherein the step of determining a percentage of data stored per tier for a compressed arrangement of data in the data storage resources further comprises:
program instructions to access performance information from the data storage resources arranged in tiers; and
program instructions to calculate a percentage of data that must be stored in a higher tier based on the accessed performance information.

* * * * *